United States Patent
You et al.

(10) Patent No.: US 10,160,485 B2
(45) Date of Patent: Dec. 25, 2018

(54) APPARATUS AND METHOD FOR AUTOMATIC STEERING CONTROL IN VEHICLE

(71) Applicant: Hyundai Motor Company, Seoul (KR)

(72) Inventors: Byung Yong You, Gyeonggi-do (KR); Myung Seon Heo, Seoul (KR); Young Chul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 159 days.

(21) Appl. No.: 15/204,849

(22) Filed: Jul. 7, 2016

(65) Prior Publication Data

US 2017/0129535 A1    May 11, 2017

(30) Foreign Application Priority Data

Nov. 11, 2015  (KR) .................. 10-2015-0157991

(51) Int. Cl.
  *B62D 15/02*    (2006.01)
  *B62D 6/00*    (2006.01)
  *G05D 1/00*    (2006.01)
  *G05D 1/02*    (2006.01)
  *B62D 1/28*    (2006.01)

(52) U.S. Cl.
  CPC .......... *B62D 6/002* (2013.01); *B62D 1/286* (2013.01); *B62D 15/024* (2013.01); *B62D 15/025* (2013.01); *G05D 1/0088* (2013.01); *G05D 1/0246* (2013.01); *G05D 2201/0213* (2013.01)

(58) Field of Classification Search
  None
  See application file for complete search history.

(56) References Cited

U.S. PATENT DOCUMENTS

| | | | |
|---|---|---|---|
| 4,819,169 A | 4/1989 | Saitoh et al. | |
| 5,208,750 A | * 5/1993 | Kurami | G05D 1/0251 180/168 |
| 5,245,422 A | * 9/1993 | Borcherts | G05D 1/0246 348/119 |
| 5,249,126 A | * 9/1993 | Hattori | G05D 1/0221 701/27 |
| 5,414,625 A | * 5/1995 | Hattori | G05D 1/0246 180/169 |
| 5,448,487 A | * 9/1995 | Arai | B62D 1/28 701/28 |

(Continued)

FOREIGN PATENT DOCUMENTS

| | | |
|---|---|---|
| JP | 06-064548 A | 3/1994 |
| JP | 2002-132343 A | 5/2002 |

(Continued)

*Primary Examiner* — Navid Ziaeianmehdizadeh
(74) *Attorney, Agent, or Firm* — Mintz Levin Cohn Ferris Glovsky and Popeo, P.C.; Peter F. Corless

(57) ABSTRACT

A steering control method and device for autonomous vehicles is provided. The steering control method includes sensing traffic lanes on a road on which a vehicle is being driven and deriving a vanishing point positioned on lines extending from the traffic lanes. A sensitivity of a steering angle that corresponds to a vertical coordinate of the vanishing point in a matrix and an initial steering angle that corresponds to a horizontal coordinate are then determined. Further, a steering control value that corresponds to the initial steering angle and the sensitivity of the steering angle are determined.

16 Claims, 10 Drawing Sheets

(56) References Cited

U.S. PATENT DOCUMENTS

| | | | | |
|---|---|---|---|---|
| 5,661,650 | A * | 8/1997 | Sekine | B62D 1/28 340/438 |
| 5,815,825 | A * | 9/1998 | Tachibana | G05D 1/024 180/169 |
| 5,913,376 | A * | 6/1999 | Takei | B60K 31/0058 180/168 |
| 6,091,833 | A * | 7/2000 | Yasui | G05D 1/0246 348/118 |
| 6,173,222 | B1 * | 1/2001 | Seo | B62D 1/28 180/421 |
| 7,015,952 | B2 * | 3/2006 | Okada | H04N 5/23248 340/937 |
| 7,406,182 | B2 * | 7/2008 | Ono | B60R 1/00 348/148 |
| 7,602,946 | B2 * | 10/2009 | Watanabe | G06T 7/248 382/107 |
| 8,392,064 | B2 * | 3/2013 | Thrun | B62D 15/025 701/41 |
| 8,520,898 | B2 * | 8/2013 | Hue | G01N 21/538 382/103 |
| 8,520,952 | B2 * | 8/2013 | Hue | G06K 9/00791 382/104 |
| 9,412,168 | B2 * | 8/2016 | Shimizu | G06K 9/00798 |
| 9,834,153 | B2 * | 12/2017 | Gupta | G03B 43/00 |
| 2002/0081001 | A1 * | 6/2002 | Tsuji | G05D 1/0246 382/104 |
| 2002/0095246 | A1 * | 7/2002 | Kawazoe | B62D 15/025 701/1 |
| 2005/0273260 | A1 * | 12/2005 | Nishida | B60Q 1/34 701/301 |
| 2011/0115912 | A1 * | 5/2011 | Kuehnle | G06K 9/00798 348/148 |
| 2014/0043473 | A1 * | 2/2014 | Gupta | G06T 7/0018 348/135 |
| 2014/0092237 | A1 * | 4/2014 | Watanabe | B60R 1/00 348/118 |
| 2014/0118552 | A1 * | 5/2014 | Takahama | G06K 9/00798 348/148 |
| 2015/0049193 | A1 * | 2/2015 | Gupta | G03B 43/00 348/148 |
| 2016/0107682 | A1 * | 4/2016 | Tan | B62D 6/00 701/41 |
| 2017/0293303 | A1 * | 10/2017 | Medagoda | A01L 369/008 |

FOREIGN PATENT DOCUMENTS

| | | |
|---|---|---|
| KR | 2002-0053346 A | 7/2002 |
| KR | 2004-0067584 A | 7/2004 |
| KR | 10-2012-0063375 A | 6/2012 |
| KR | 10-1167099 B1 | 7/2012 |
| KR | 10-1549165 B1 | 9/2015 |

* cited by examiner

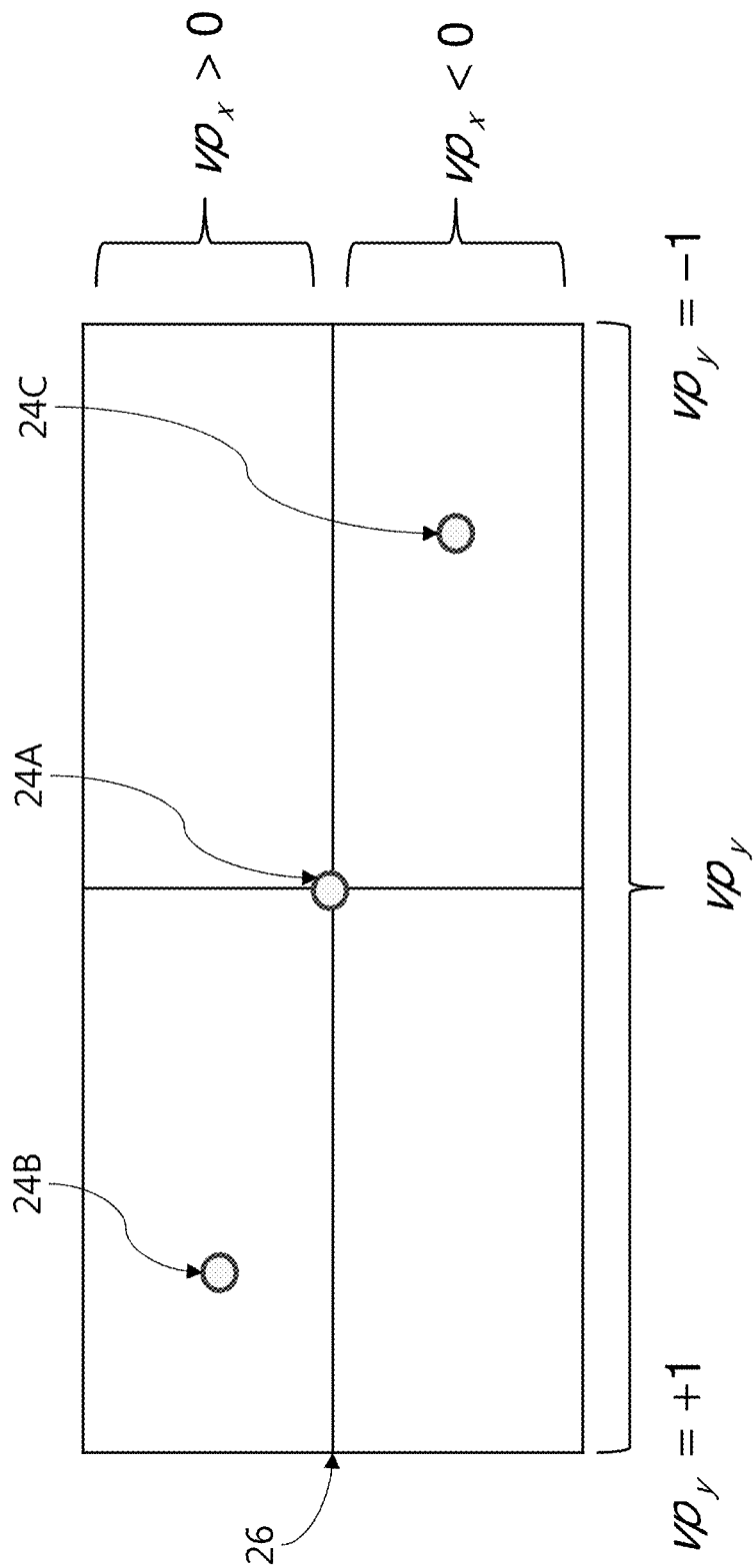

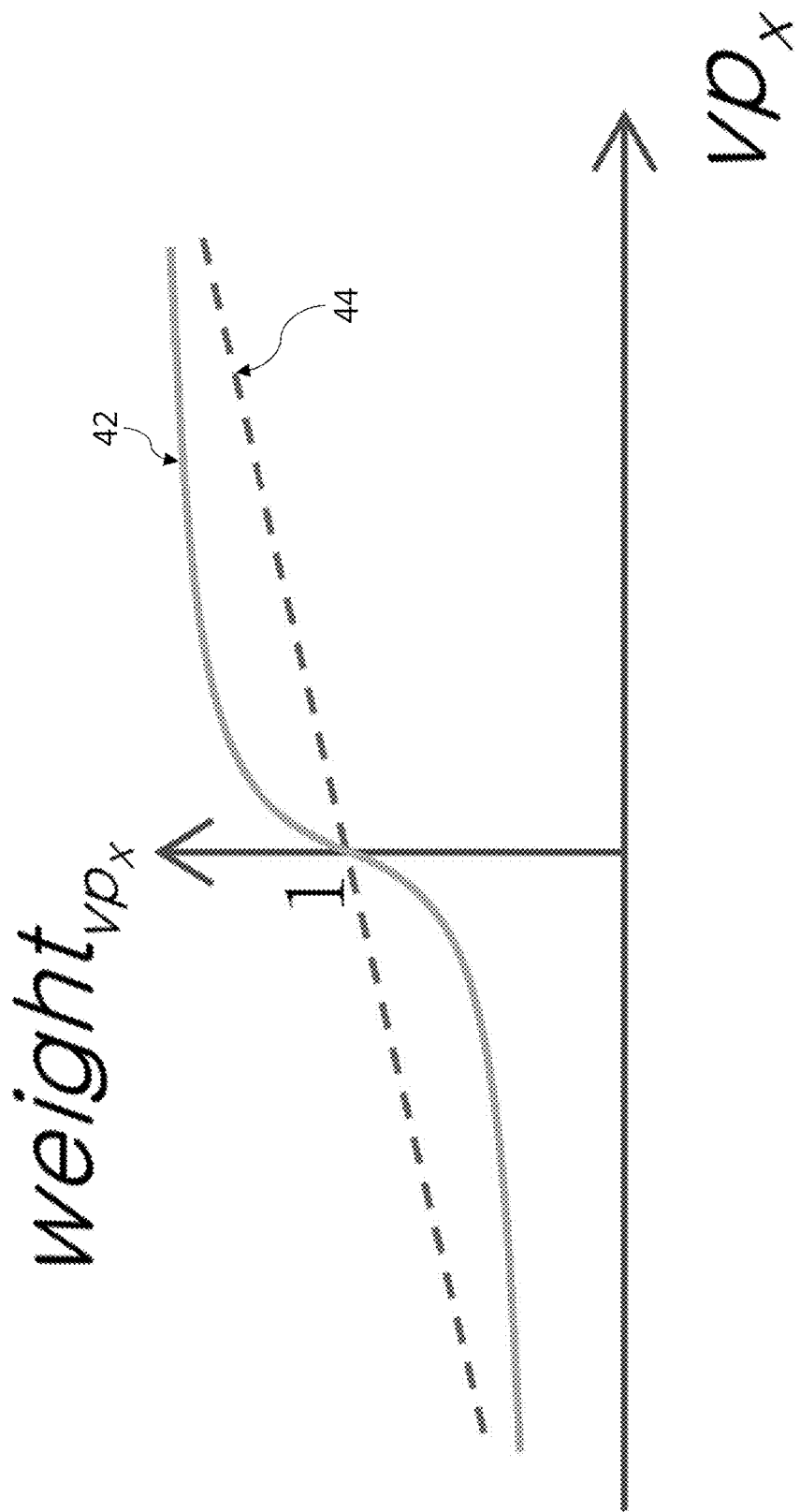

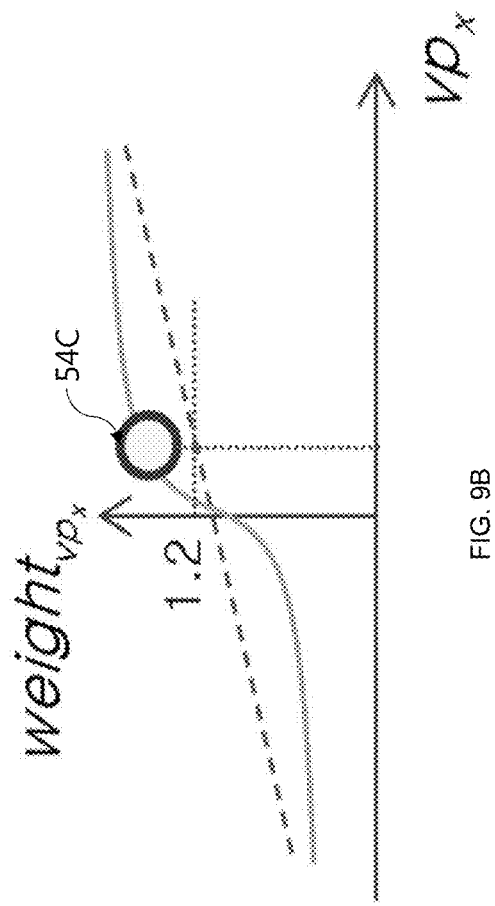
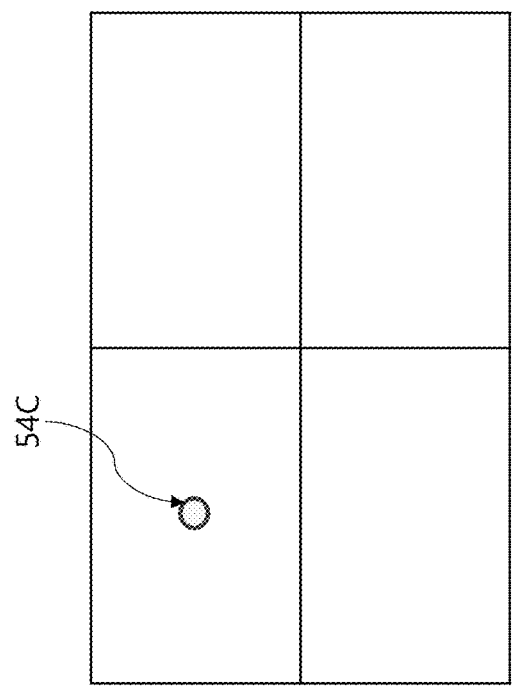
FIG. 9B
FIG. 9A

APPARATUS AND METHOD FOR AUTOMATIC STEERING CONTROL IN VEHICLE

CROSS-REFERENCE TO RELATED APPLICATION(S)

This application claims the benefit of Korean Patent Application No. 10-2015-0157991, filed on Nov. 11, 2015, which is hereby incorporated by reference as if fully set forth herein.

BACKGROUND

Field of the Invention

The present invention relates to a steering control method and device for autonomous vehicles and, more particularly, to a method and device of adjusting a steering angle to adjust the traveling of a vehicle even on a curved road or a sloped road.

Discussion of the Related Art

Vehicles have been developed to provide a driver with a more comfortable and safer driving environment. However, due to the increase in the number of produced vehicles, the incidence of traffic accidents has also increased, and it has become difficult to provide a driver with a safe driving environment. Recently, safety control systems for improving driver's safety and convenience have been developed. Research regarding intelligent driver support systems for providing a driver with a more comfortable and safer driving environment is also actively being performed, and is ultimately expanded to encompass research on autonomous driving control systems.

Different from an unmanned vehicle, an autonomous driving system is a system in which a driver is on board and a control system operates and adjusts the traveling of a vehicle in both the left-right direction and the forward-backward direction based on the state of the driver and the traveling of a vehicle. While the vehicle travels autonomously using such an autonomous driving system, when the driver has no intention to manipulate the steering wheel, the autonomous driving mode is maintained (e.g., not be released) even when unintended force is applied to the steering wheel. Meanwhile, when the driver intends to steer the vehicle, for example, intentionally manipulates the steering wheel in an emergency situation, the driver must promptly take back driving control from the control system.

SUMMARY

Accordingly, the present invention is directed to a steering control method and device for autonomous vehicles that substantially obviates one or more problems due to limitations and disadvantages of the related art. An object of the present invention is to provide a steering control method and device which directly calculate a steering angle based on information regarding a vanishing point obtained while an autonomous vehicle or an unmanned vehicle senses traffic lanes.

Another object of the present invention is to provide a steering control method and device which calculate a steering control value using a tuning process based on a vanishing point matrix and a weighted value function even on a curved road or a sloped road. A further object of the present invention is to provide a steering control method and device which obtain additional information regarding the road environment while an autonomous vehicle or an unmanned vehicle calculates a steering angle and provide the information to auxiliary travel devices mounted to the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects and other advantages and in accordance with the purpose of the invention, as embodied and broadly described herein, a steering control method for autonomous vehicles may include sensing traffic lanes on a road on which a vehicle is being driven and deriving a vanishing point positioned on lines extending from the traffic lanes (e.g., road lane markings), determining a sensitivity of a steering angle that corresponds to a vertical coordinate of the vanishing point in a matrix and determining an initial steering angle that corresponds to a horizontal coordinate, and determining a steering control value that corresponds to the initial steering angle and the sensitivity of the steering angle.

The traffic lanes may be located to the left and right of the vehicle, and may be sensed by front imaging devices mounted to the vehicle. The vanishing point may be located ahead of the traveling vehicle, and may be an imaginary point at which the traffic lanes located to the left and right of the vehicle meet. Based on the vertical coordinate, when the vanishing point is located in a center, the sensitivity of the steering angle may be 1. When the vanishing point is located in an upper region, the sensitivity of the steering angle may be greater than 1. Additionally, when the vanishing point is located in a lower region, the sensitivity of the steering angle may be less than 1. Based on the horizontal coordinate, when the vanishing point is located in a center, the initial steering angle may be about 0 degrees, and when the vanishing point is located in a left or right region, the initial steering angle may be a position proportional value between the center and a maximum steering angle.

The maximum steering angle may be a predetermined value that corresponds to a detection range of at least one imaging device mounted to the vehicle. The detection range may be determined by the mounting position and the performance of the imaging device. The steering control method may further include, when the vanishing point is located in a center based on the vertical coordinate, determining an offset value of a steering control device mounted to the vehicle. The offset value may be used to determine the steering control value. The initial steering angle may be a value obtained by multiplying a maximum steering angle by a proportional value of the horizontal coordinate, and the proportional value may range from −1 to 1. The steering control value may be determined by the following equation:

$$\delta = 0.5[sgn(vp_y)+1]*(vp_y*\text{steer\_max})*\text{weight}_{vp_x} - 0.5[sgn(vp_y)-1]*(vp_y*\text{steer\_max})*\text{weight}_{vp_x} + \delta_{\text{offset}}$$

wherein delta($\delta$) may be the steering control value, VPx and VPy may be, respectively, a vertical coordinate value and a proportional value of the horizontal coordinate, each ranging from −1 to 1, sgn( ) may be a function of outputting 1 when a variable is a positive value and outputting −1 when a variable is a negative value, steer_max may be a maximum steering angle, weight may be the sensitivity of the steering angle, and delta($\delta$)$_{\text{offset}}$ may be an offset value of a steering control device.

In another aspect of the present invention, an apparatus for automatic steering control in a vehicle may include a processing system that comprises at least one data processor and at least one non-transitory computer-readable memory storing a computer program. Herein, the processing system may cause the apparatus to sense traffic lanes on a road on which a vehicle is running and deriving a vanishing point positioned on lines extending from the traffic lanes, determine a sensitivity of a steering angle that corresponds to a vertical coordinate of the vanishing point in a matrix and determining an initial steering angle that corresponds to a horizontal coordinate, and determine a steering control value that corresponds to the initial steering angle and the sensitivity of the steering angle. In another aspect of the present invention, a non-transitory computer-readable recording medium records the above-described steering control method therein.

In a further aspect of the present invention, a steering control device for autonomous vehicles may include a sensing unit configured to sense traffic lanes on a road on which a vehicle is traveling, a vanishing point deriving unit configured to derive a vanishing point positioned on lines extending from the traffic lanes, a storage unit configured to store a vanishing point matrix for analyzing an environment of the road and a position of the vanishing point, and a calculating unit configured to determine a sensitivity of a steering angle that corresponds to a vertical coordinate in the matrix, determine an initial steering angle that corresponds to a horizontal coordinate, and determine a steering control value that corresponds to the initial steering angle and the sensitivity of the steering angle.

The steering control device may further include a front imaging device or a sensor configured to sense the traffic lanes located to the left and right of the vehicle. The vanishing point may be located ahead of the traveling vehicle, and may be an imaginary point at which the traffic lanes located to the left and right of the vehicle meet.

Based on the vertical coordinate, when the vanishing point is located in a center, the sensitivity of the steering angle may be 1. When the vanishing point is located in an upper region, the sensitivity of the steering angle may be greater than 1. When the vanishing point is located in a lower region, the sensitivity of the steering angle may be less than 1. Based on the horizontal coordinate, when the vanishing point is located in a center, the initial steering angle may be 0 degrees, and when the vanishing point is located in a left or right region, the initial steering angle may be a position proportional value between the center and a maximum steering angle.

The maximum steering angle may be a predetermined value that corresponds to a detection range of at least one imaging device mounted to the vehicle. The detection range may be determined by the mounting position and the performance of the imaging device. When the vanishing point is located in a center based on the vertical coordinate, the calculating unit may be configured to determine an offset value of the steering control device mounted to the vehicle, and determine the steering control value using the offset value. The initial steering angle may be a value obtained by multiplying a maximum steering angle by a proportional value of the horizontal coordinate, and the proportional value may range from −1 to 1.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 5 illustrates the vanishing point matrix;

FIG. 6 illustrates a sensitivity of a steering angle;

FIGS. 9A-9B illustrate a third case of calculating the vehicle steering value.

DETAILED DESCRIPTION

Figure 1C:
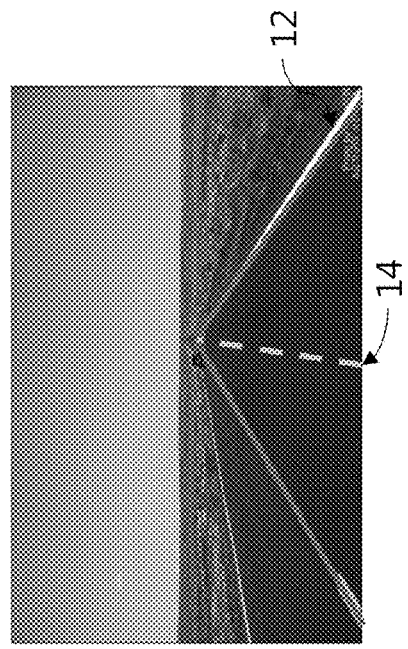
FIGS. 1A-1C illustrate a method of calculating control parameters for steering a vehicle.

Reference will now be made in detail to the exemplary embodiments of the present invention, examples of which are illustrated in the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Suffixes "module" and "unit" used in a configuration component described hereinafter are assigned or used together in consideration of only the convenience in creating this specification, and the two suffixes themselves do not have any distinguished meanings or roles from each other. It should be understood that when an element is referred to as being "on" or "under" another element, it may be directly on/under the element, and/or one or more intervening elements may also be present. When an element is referred to as being "on" or "under", "under the element" as well as "on the element" may be included based on the element.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Figure 1A:
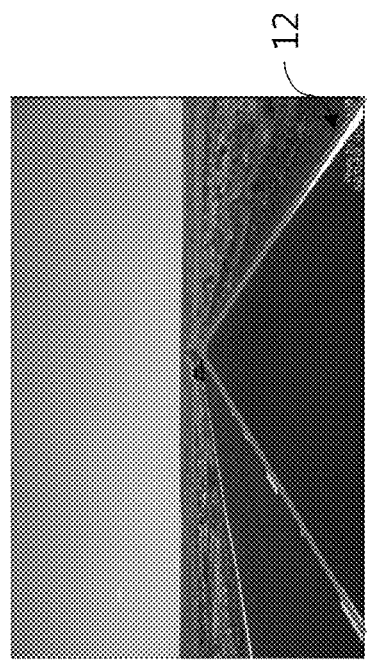
Figure 1B:
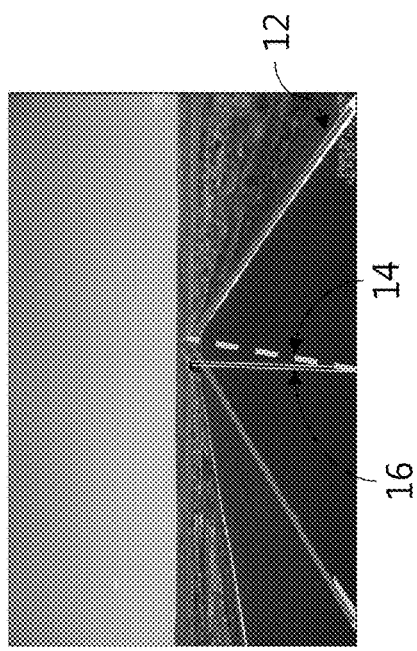

FIGS. 1A-1C illustrate a method of calculating control parameters for steering a vehicle. In particular, FIG. 1A illustrates that the traveling vehicle may be configured to recognize traffic lanes 12, FIG. 1B illustrates a process of calculating the direction 14 in which the vehicle is to travel based on the recognized traffic lanes, and FIG. 1C illustrates a process of calculating the difference between the current vehicle traveling direction 16 and the calculated vehicle traveling direction 14.

As shown in the drawing, the autonomous vehicle steering control may be performed as described herein below. The traffic lanes may first be recognized using imaging devices (e.g., cameras, video cameras, etc.), sensors, etc. mounted to the vehicle, a driving path may be generated, and control parameters (e.g. a deviation angle, a deviation distance, etc.) may be calculated. Accordingly, a steering control value may be derived, and the steering control may be achieved based on the steering control value. For instance, the steering angle may be calculated from the following equation.

$$\delta(t) = \theta_e(t) + \tan^{-1}\left(\frac{ke_{fa}(t)}{v_x(t)}\right) \quad \text{Eq. 1}$$

where delta($\delta$) is a steering angle, $q_e$ is a deviation angle, k is a design parameter, $e_{fa}$ is a deviation distance, and $V_x$ is a vehicle speed.

The above described method does not have a problem for a substantially straight road or a minimally curved road. However, this method may have a shortcoming in that it may be difficult to achieve tuning, which is a process of calculating a control gain through a mathematical or experimental/experiential method to derive an actual target value by varying control parameters for steering control on a sharply curved road or a sloped road.

There are many types of vehicle steering control methods, which are typically classified into a control method that does not use a vehicle model and a control method that uses a vehicle model. Representative vehicle steering control methods may include a pure pursuit method, a Stanley method, a proportional-integral-derivative (PID) control method, a kinematic control method, and an optimal control method.

The pure pursuit method is one of available path tracking methods, and may include a process of geometrically calculating the curvature of a circular arc that connects the rear axle location to a goal point on the path ahead of the vehicle. The coordinates of the goal point may be determined from a predetermined look-ahead distance from the current rear axle position to the desired path. The steering angle of the vehicle may be determined using only the coordinates of the goal point and the angle between the vehicle's heading vector and the look-ahead vector.

The Stanley method is a path tracking approach used in an unmanned vehicle that is being developed at Stanford University. The Stanley method uses a nonlinear feedback function of the cross track error measured from the center of the front axle to the nearest path point. Further, the proportional-integral-derivative (PID) control method is an approach using feedback control, and includes processes of measuring the output of the steering angle to be adjusted, calculating an error by comparing the output with the desired reference value or setpoint, and calculating a control value necessary for the adjustment using the error. The kinematic control method and the optimal control method, which use a vehicle model, may calculate a steering value using the kinematic features of the vehicle model.

Figure 2A:
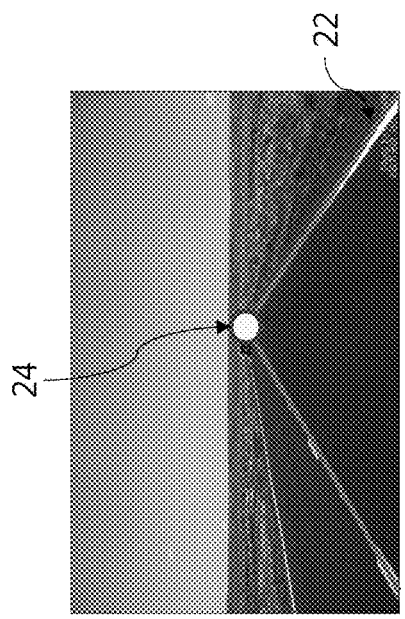
FIGS. 2A-2B illustrate a method of calculating a vehicle steering value using a vanishing point matrix.
Figure 2B:
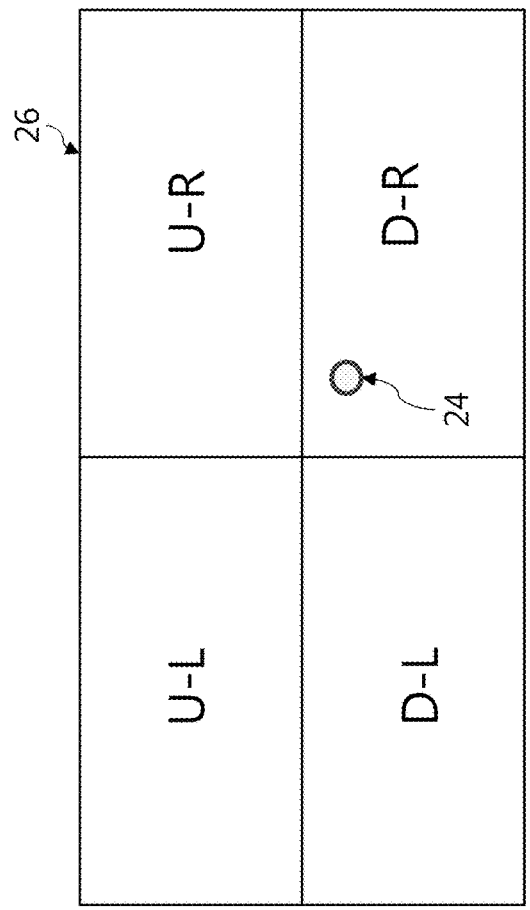

FIGS. 2A-2B illustrate a method of calculating the vehicle steering value using a vanishing point matrix. In particular, FIG. 2A illustrates that the traveling vehicle may be configured to recognize a vanishing point 24 based on the lanes 22, and FIG. 2B illustrates a process of determining which region of the matrix 26 the recognized vanishing point 24 belongs to. First, referring to FIG. 2A, the traveling vehicle may be configured to sense the left and right lanes 22, and recognize the vanishing point 24, at which the lines extending from the two lanes meet, using a sensor operated by a controller.

Additionally, a 2×2 matrix may be used to determine the position of the vanishing point 24. The position of the center point ahead of the traveling vehicle may be determined in the left-right direction and the up-down direction through the matrix. The matrix may be divided into four regions, including an upper-left region U-L, an upper-right region U-R, a lower-left region D-L and a lower-right region D-R, and which of the four regions the vanishing point 24 belongs or corresponds to may be determined. The four regions of the matrix may be used to determine whether the vehicle requires a left or right turn or whether the vehicle is to travel on an uphill road or a downhill road.

Figure 3:
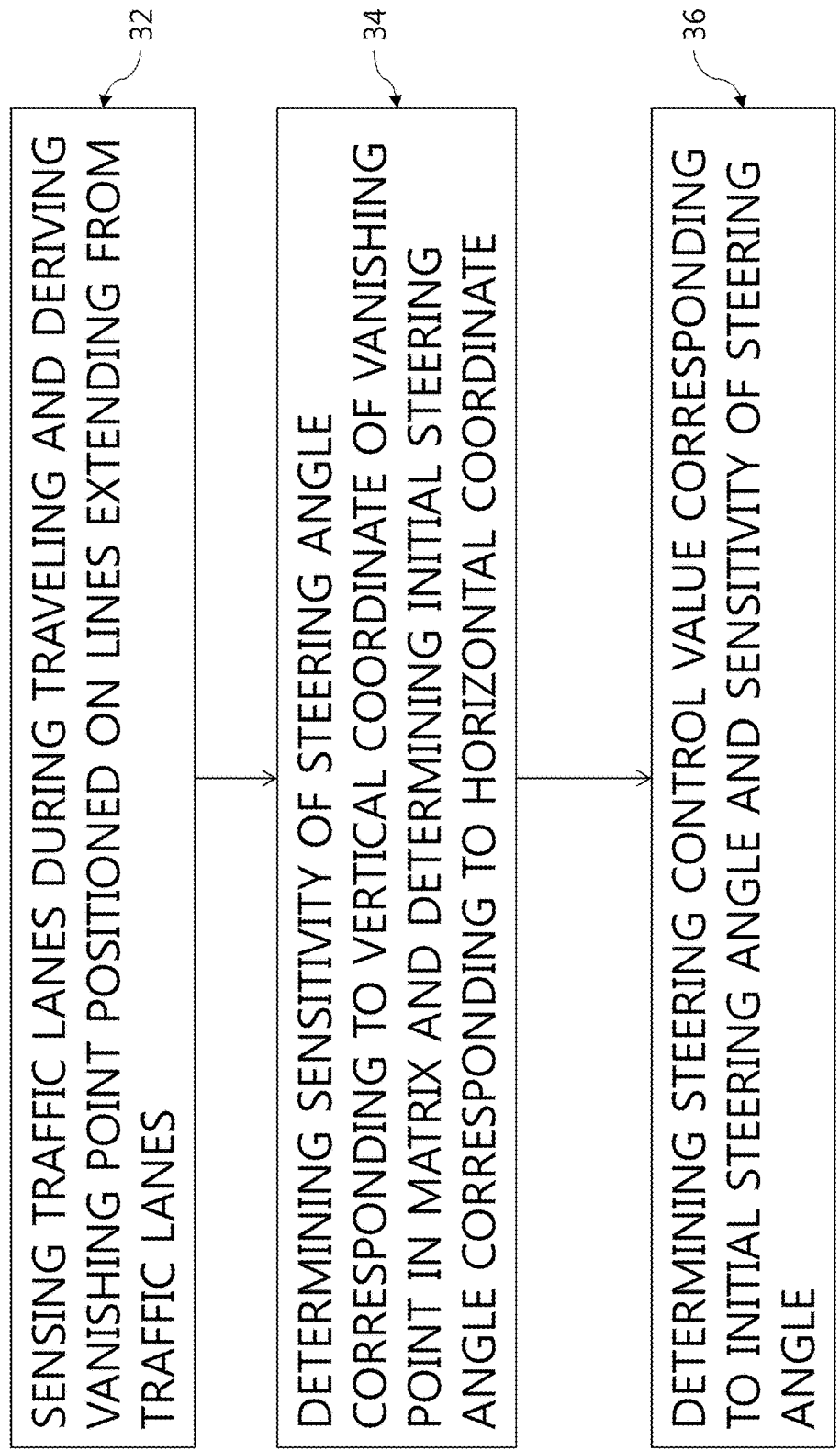
FIG. 3 illustrates a steering control method for an autonomous vehicle.

FIG. 3 illustrates a steering control method for an autonomous vehicle. As shown in FIG. 3, the steering control method for an autonomous vehicle may include sensing traffic lanes from the traveling vehicle and deriving a vanishing point positioned on the lines extending from the traffic lanes (32), determining the sensitivity of the steering angle that corresponds to the vertical coordinate of the vanishing point in the matrix and determining the initial steering angle that corresponds to the horizontal coordinate (34), and determining the steering control value that corresponds to the initial steering angle and the sensitivity of the steering angle (36).

The number of traffic lanes sensed by the traveling vehicle may be two, located to the left and right of the vehicle. The two traffic lanes may be sensed using front imaging devices or sensors mounted to the vehicle regardless of their types and shapes. The vanishing point may be located ahead of the traveling vehicle, and is an imaginary point at which two traffic lanes located to the left and right of the vehicle meet or converge. In other words, a line may be drawn from each other the two traffic lanes and the intersection between the lines may be considered to be the vanishing point. The matrix for analyzing the vanishing point may be stored in the controller of the vehicle. When the derived vanishing point is mapped to the matrix, a proportional value with respect to the vertical coordinate and the horizontal coordinate may be obtained.

Furthermore, when a first of the left and right traffic lanes is detected and a second of the left and right traffic lanes is not detected, the vanishing point located at the cross of the lines extending from the two traffic lanes may not be derived. Accordingly, the vehicle may deviate from a road lane in which the vehicle is being driven (e.g. is traveling on the shoulder of the road). Accordingly, to secure the normal traveling of the vehicle, the steering angle may be determined within the predetermined range to be directed toward the direction of the detected lane.

Figure 4B:
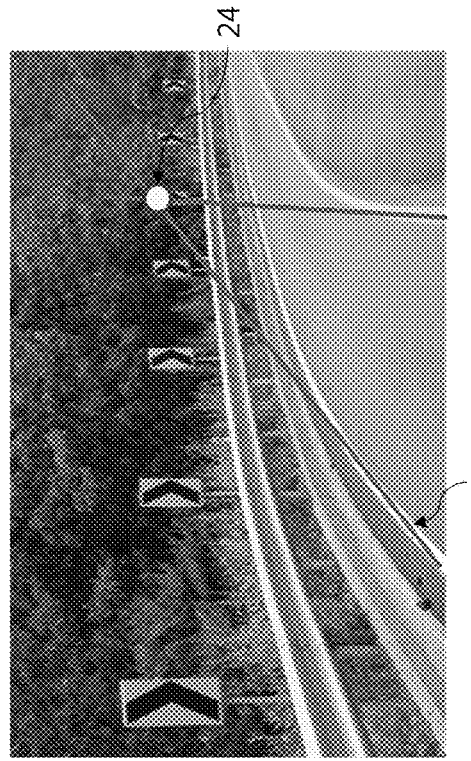
FIGS. 4A-4D illustrate a method of deriving a vanishing point based on lanes sensed by the traveling vehicle.

Hereinafter, a method of deriving the vanishing point will be explained in detail. FIGS. 4A-4D illustrate a method of deriving the vanishing point based on the lanes sensed by the traveling vehicle. In particular, FIGS. 4A through 4B illustrate the traffic lanes 22 sensed by the vehicle traveling on different road environments and the position of the vanishing point 24 based on the traffic lanes.

For example, FIG. 4A illustrates the situation in which the vehicle travels on a substantially straight road having no slope (e.g., no inclination). After the traffic lanes 22 are sensed by the traveling vehicle, the vanishing point 24 may be derived based on the lines extending from the traffic lanes. At this time, the vanishing point 24 may be located at the center (e.g., without being biased in the left-right direction or the up-down direction) ahead of the traveling vehicle.

FIG. 4B illustrates the situation in which the vehicle travels on a sharply right-curved uphill road (e.g., an inclined or slanted road). After the traffic lanes 22 are sensed by the traveling vehicle, the vanishing point 24 may be derived based on the lines extending from the traffic lanes. At this time, the vanishing point 24 may be located at an upper-right position biased from the center ahead of the traveling vehicle.

Figure 4D:
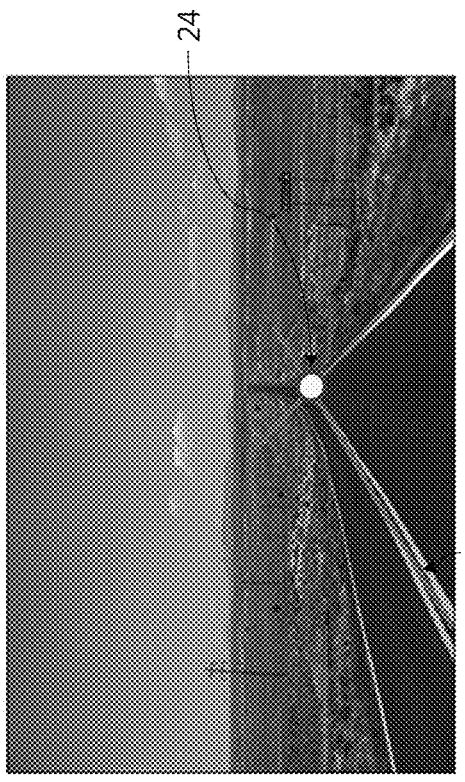
Figure 4A:
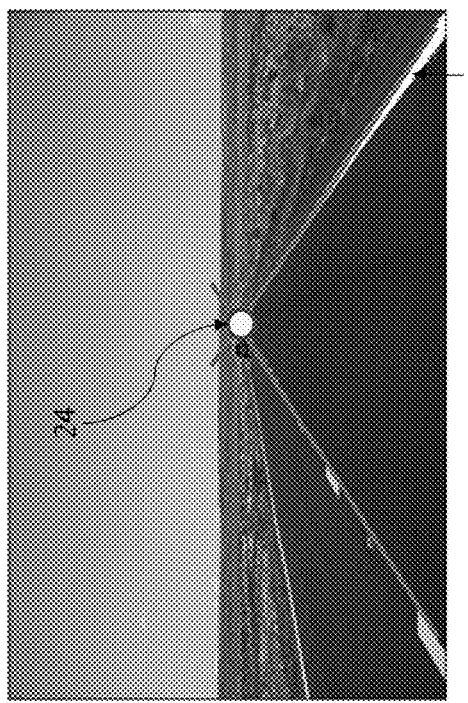
Figure 4C:
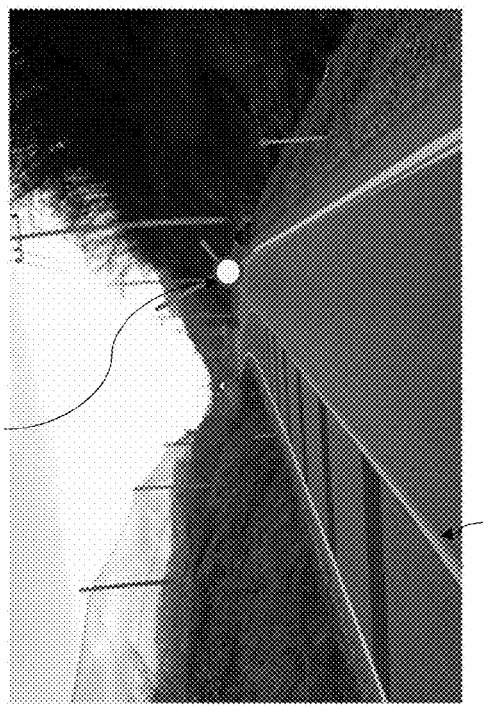

FIG. 4C illustrates the situation in which the vehicle travels on an uphill or inclined road. After the traffic lanes 22 are sensed by the traveling vehicle, the vanishing point 24 may be derived based on the lines extending from the traffic lanes. At this time, the vanishing point 24 may be located at an upper position biased from the center ahead of the traveling vehicle.

FIG. 4D illustrations the situation in which the vehicle travels on a downhill road. After the traffic lanes 22 are sensed by the traveling vehicle, the vanishing point 24 may be derived based on the lines extending from the traffic lanes. At this time, the vanishing point 24 may be located at a lower position biased from the center ahead of the traveling vehicle.

Referring to the aforementioned FIGS. 4A through 4D, when the left and right traffic lanes are sensed by the traveling vehicle and the vanishing point is derived based on the sensed traffic lanes, it may be possible to detect the current environment of the road on which the vehicle is traveling or being driven.

FIG. 5 illustrates the vanishing point matrix. As shown in FIG. 5, the vanishing point matrix 26 may have a 2×2 structure, which is divided into four regions in the left-right direction and the up-down direction around the center point. For instance, three different vanishing points 24A, 24B and 24C may be located in different respective regions in the vanishing point matrix 26. The positions of the vanishing points 24A, 24B and 24C may be determined by the vertical coordinate value VPx and the proportional value VPy that correspond to the horizontal coordinate in the vanishing point matrix 26. Herein, the proportional value VPy that corresponds to the horizontal coordinate may be determined within the range from −1 to +1.

The vertical coordinate value VPx located above the center in the vanishing point matrix 26 may have a positive value (e.g. 24B), and the vertical coordinate value VPx located below the center may have a negative value (e.g. 24C). Further, the vanishing point matrix may be designed such that the vertical coordinate value VPx also has a proportional value, like the horizontal coordinate.

When the vanishing point 24A is located in the center based on the horizontal coordinate in the matrix, the initial steering angle may be 0 degrees. When the vanishing point 24B or 24C is located in the left or right region based on the horizontal coordinate in the matrix, the initial steering angle may have a proportional value VPy that corresponds to the horizontal coordinate, which is a position proportional value between the center and the maximum steering angle. For example, when the vanishing point 24B is located in the left region based on the horizontal coordinate, the proportional value VPy that corresponds to the horizontal coordinate may have a positive value ranging from 0 to 1. When the vanishing point 24C is located in the right region, the proportional value VPy that corresponds to the horizontal coordinate may have a negative value ranging from 0 to −1.

The initial steering angle, which may be obtained through the horizontal coordinate of the vanishing point, may be determined by multiplying the maximum steering angle by the proportional value VPy that corresponds to the horizontal coordinate. In particular, the maximum steering angle may be a predetermined value that corresponds to the detection range of at least one imaging device (e.g., camera, video camera, or the like) or sensor mounted to the vehicle. For example, when the detection range of the imaging device is about 270 degrees, the maximum steering angle may be determined to about 270 degrees. The detection range may be determined by the mounting position and the performance (e.g. an angle of view) of the imaging device or sensor. When the vanishing point (e.g. 24A) is located in the center based on the vertical coordinate, an offset value of the steering control device mounted to the vehicle may be determined. The offset value may be used to determine a steering control value.

Hereinafter, a method of calculating the steering control value will be explained.

The steering control value may include a left-turn value, a right-turn value and an offset value. For example, the steering control value may be determined using the equation below.

$$\delta = 0.5[sgn(vp_y)+1]*(vp_y*\text{steer\_max})*\text{weight}_{vp_x} - 0.5[sgn(vp_y)-1]*(vp_y*\text{steer\_max})*\text{weight}_{vp_x} + \delta_{\text{offset}} \qquad \text{Eq. 2}$$

wherein, delta($\delta$) is a steering control value, VPx and VPy are, respectively, a vertical coordinate value and a proportional value of the horizontal coordinate, which range from −1 to 1, sgn( ) is a function of outputting 1 when a variable is a positive value and outputting −1 when a variable is a negative value, steer_max is a maximum steering angle, weight is a sensitivity of the steering angle, which is a weighted value that is adjusted in accordance with a slope of the road, and delta($\delta$)$_{\text{offset}}$ is an offset value of the steering control device.

Furthermore, when the vanishing point 24A is located in the center in the vanishing point matrix 26, according to the above equation 2, VPx and VPy are all 0, and the steering control value should be 0. However, due to various equipment, such as imaging devices, sensors, the steering control device, etc., mounted to the real vehicle, the steering control value may not be 0. Further, when a non-zero value (e.g. 2) is output, it may be determined to an offset value of the steering control device.

FIG. 6 illustrates the sensitivity of the steering angle. As shown in FIG. 6, the sensitivity 42 of the steering angle, which is attributable to a change in the slope of the road (e.g., an uphill road or a downhill road, that is, a vertical change in the road), may be estimated or estimated using various methods. However, since the calculation process is complex when using the actual sensitivity 42 of the steering angle to determine a steering control value and since the actual sensitivity 42 of the steering angle differs based on the characteristics of respective vehicles, the application of the actual sensitivity 42 of the steering angle may not lead to an improved effect. Accordingly, a sensitivity sample 44 may be determined through tuning, which is a process of calculating the effect of a change in the slope of the actual road on the steering angle of the vehicle running on the road using a mathematical or experimental/experiential method.

For instance, when the vanishing point is located in the center based on the vertical coordinate, the sensitivity of the steering angle may be 1. When the vanishing point is located in an upper region based on the vertical coordinate, the sensitivity of the steering angle may be greater than 1. Further, when the vanishing point is located in a lower region based on the vertical coordinate, the sensitivity of the steering angle may be less than 1.

Figure 7B:
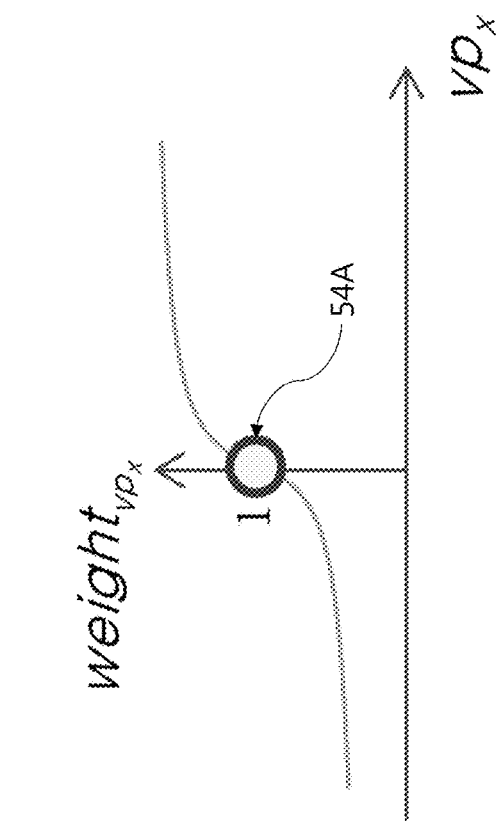
FIGS. 7A-7B illustrate a first case of calculating the vehicle steering value.
Figure 7A:
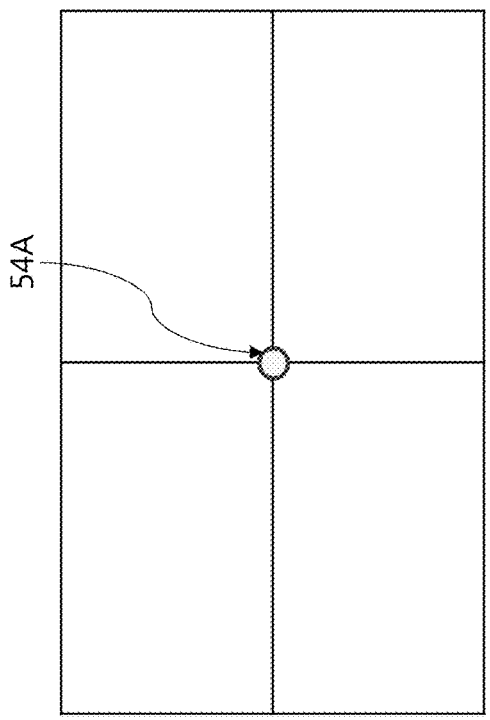

FIGS. 7A-7B illustrate a first case of calculating the vehicle steering value. As shown in the figures, a vanishing point 54A derived from the first case may be located in the center in the vanishing point matrix. The application of the aforementioned equation 2 to the first case is as follows.

$$\delta = 0.5[sgn(vp_y)+1]*(vp_y*\text{steer\_max})*\text{weight}_{vp_x} - 0.5[sgn(vp_y)-1]*(vp_y*\text{steer\_max})*\text{weight}_{vp_x} + \delta_{\text{offset}}$$

Since the vanishing point is located in the center in the vanishing point matrix, 0 should be output as the steering control value delta($\delta$). When a non-zero value is output, it may be determined to an offset value delta($\delta$)$_{\text{offset}}$ the steering control device. When the offset value delta($\delta$)$_{\text{offset}}$ of the steering control device is predetermined and the vanishing point 54A derived during running of the vehicle is located in the center in the vanishing point matrix, although the result of arithmetic operation for parts including the vertical coordinate value and the proportional value of the horizontal coordinate is not 0, the steering control value d may be 0 due to the application of the offset value delta($\delta$)$_{\text{offset}}$ of the steering control device.

Figure 8B:
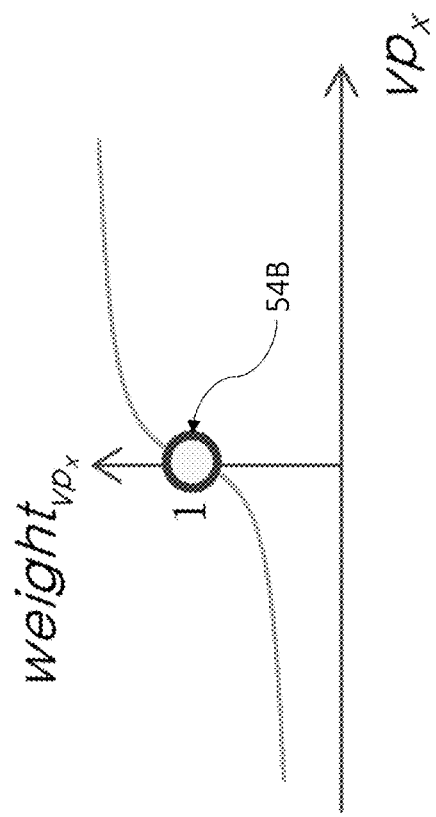
FIGS. 8A-8B illustrate a second case of calculating the vehicle steering value.
Figure 8A:
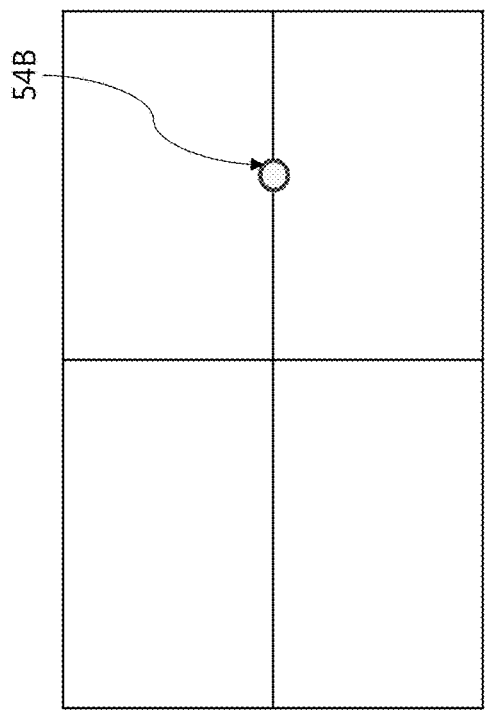

FIGS. 8A-8B illustrate a second case of calculating the vehicle steering value. As shown in the drawing, a vanishing point 54B derived from the second case (e.g., a right turn on a substantially flat road) may be located in the center based on the vertical coordinate and may be located in the right region based on the horizontal coordinate in the vanishing point matrix. For example, under the assumption that the vanishing point is located in the middle position of the right region in the vanishing point matrix. The application of the aforementioned equation 2 to the second case is as follows.

$$\delta = 0.5[sgn(vp_y)+1]*(vp_y*\text{steer\_max})*\text{weight}_{vp_x} - 0.5[sgn(vp_y)-1]*(vp_y*\text{steer\_max})*\text{weight}_{vp_x} + \delta_{\text{offset}}$$

Since the vanishing point is located in the center based on the vertical coordinate in the vanishing point matrix, the sensitivity of the steering angle is 1. Additionally, since the vanishing point may be located in the right region based on the horizontal coordinate, the left-turn value of the steering control value delta($\delta$) may be treated as 0. Meanwhile, VPy may be −0.5 since the vanishing point is located in the middle position of the right region based on the horizontal coordinate. Further, sgn(VPy) is −1, and equation 2 may be converted as above. Herein, under the assumption that the maximum steering angle is about 270 degrees (e.g., −270 degrees for a right turn, 270 degrees for a left turn) and the offset value of the steering control device is about +2 (e.g., 2 degrees to the left), the steering control value d may be −133 as below.

$$\delta = (-0.5*\text{steer\_max}) + \delta_{\text{offset}} = -133$$

FIGS. 9A-9B illustrate a third case of calculating the vehicle steering value. As shown in the figures, a vanishing point 54C derived from the third case (e.g., a left turn on an uphill road) may be located in the upper region based on the vertical coordinate and may be located in the left region based on the horizontal coordinate in the vanishing point matrix. The application of the aforementioned equation 2 to the third case is as follows.

$$\delta = 0.5[sgn(vp_x)+1]*(vp_y*\text{steer\_max})*\text{weight}_{vp_x} - 0.5[sgn(vp_x)-1]*(vp_y*\text{steer\_max})*\text{weight}_{vp_x} + \delta_{\text{offset}}$$

Since the vanishing point is located in the upper region based on the vertical coordinate in the vanishing point matrix, the sensitivity of the steering angle may be tuned to 1.2. Additionally, since the vanishing point is located in the left region based on the horizontal coordinate, the right-turn value of the steering control value d may be treated as 0. Meanwhile, VPy may be 0.5 since the vanishing point is located in the middle position of the left region based on the horizontal coordinate. Further, sgn(VPy) is +1, and equation 2 may be converted as above. Herein, under the assumption that the maximum steering angle is about 270 degrees (e.g., −270 degrees for a right turn, 270 degrees for a left turn) and the offset value of the steering control device is about +2 (e.g., 2 degrees to the left), the steering control value delta($\delta$) may be 164 as below.

$$\delta = (0.5*\text{steer\_max})*1.2 + \delta_{\text{offset}} = 164$$

Figure 10:
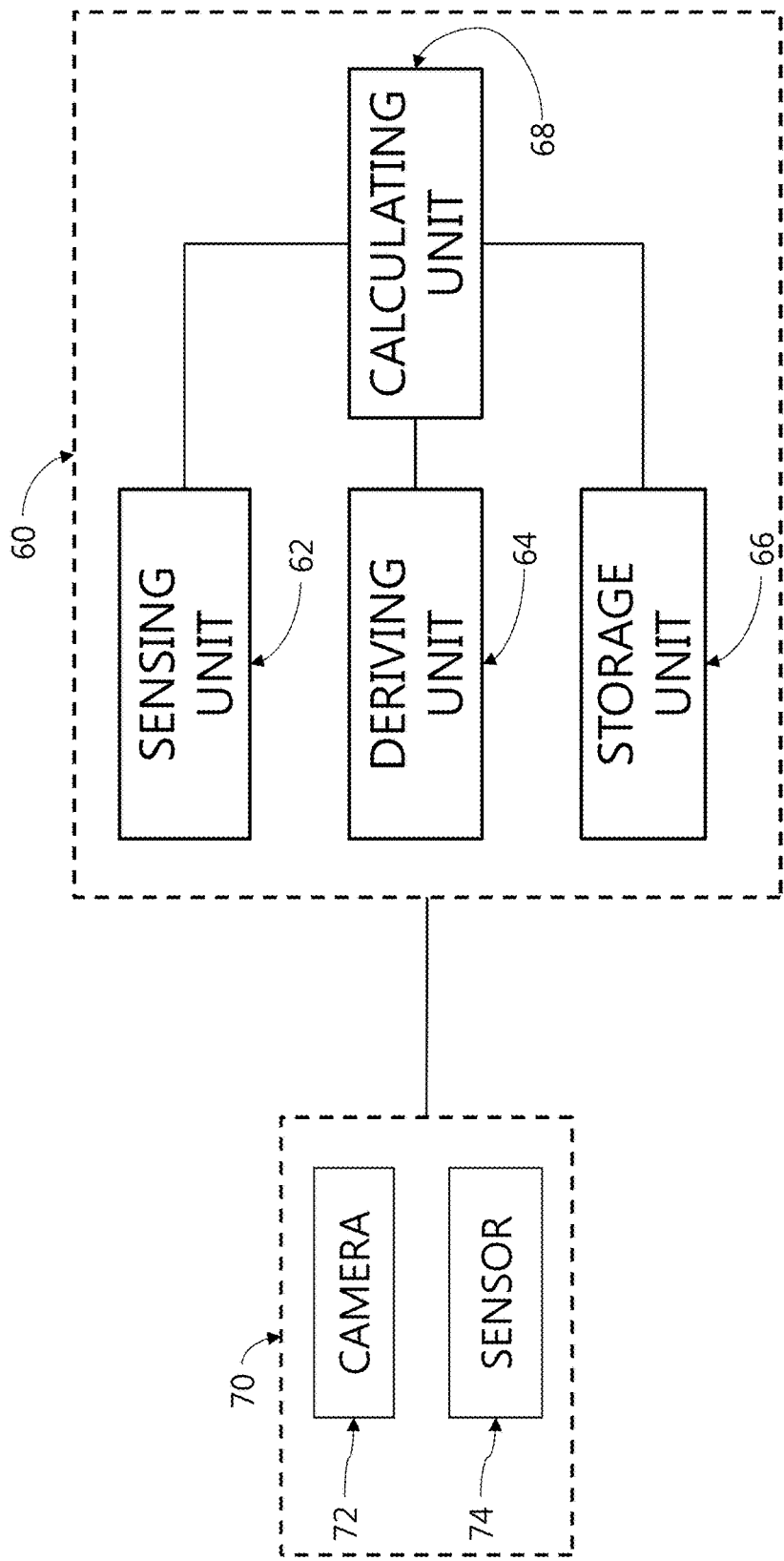
FIG. 10 illustrates a steering control device for an autonomous vehicle.

FIG. 10 illustrates the steering control device for an autonomous vehicle. As shown in FIG. 10, the steering control device 60 for an autonomous vehicle may operate cooperatively with various electronic equipment 70 mounted to the vehicle. Herein, the electronic equipment 70 may include an imaging device (e.g., a camera) 72 and a sensor 74. The imaging device 72 and the sensor 74 may be configured to sense two left and right traffic lanes while the vehicle is being driven.

The steering control device 60 for an autonomous vehicle may include a plurality of units that may be operated by a controller. In particular, the device may include a sensing unit 62 configured to sense traffic lanes on the road on which the vehicle is traveling or being driven, a vanishing point deriving unit 64 configured to derive a vanishing point, which is positioned at the cross of the lines extending from the traffic lanes, a storage unit 66 configured to store a vanishing point matrix for analyzing the road environment and the position of the vanishing point, and a calculating unit 68 configured to determine or calculate the sensitivity of the steering angle that corresponds to the vertical coordinate in the matrix, determining an initial steering angle that corresponds to the horizontal coordinate, and determining a steering control value that corresponds to the initial steering angle and the sensitivity of the steering angle. Herein, the vanishing point may be located ahead of the traveling vehicle, and is an imaginary point at which two traffic lanes located to the left and right of the vehicle meet.

The reference value of the sensitivity of the steering angle, determined by the calculating unit 68, may be 1. For instance, when the vanishing point is located in the center based on the vertical coordinate, the sensitivity of the steering angle may be 1. When the vanishing point is located in the upper region, the sensitivity of the steering angle may be greater than 1. Furthermore, when the vanishing point is located in the lower region, the sensitivity of the steering angle may be less than 1. The sensitivity of the steering angle may be a value determined by tuning, which is a process of calculating the effect of up/down (e.g., vertical) variation of the road on which the vehicle travels (i.e. travels on an uphill road or a downhill road) on the steering angle using a mathematical or experimental/experiential method.

When the vanishing point is located in the center based on the horizontal coordinate, the calculating unit 68 may be configured to determine the initial steering angle to be 0. When the vanishing point is located in the left or right region, the calculating unit 68 may be configured to determine the initial steering angle through a position proportional value between the center and the maximum steering angle. Further, the maximum steering angle may be a predetermined value that corresponds to the detection range of at least one imaging device or sensor mounted to the vehicle, and the detection range may be determined by the mounting position and the performance of the imaging device or sensor. For example, the initial steering angle is a value obtained by multiplying the maximum steering angle by the proportional value of the horizontal coordinate, and the proportional value may be determined within the range from −1 to 1.

Meanwhile, when the vanishing point is located in the center based on the vertical coordinate in the vanishing point matrix stored in the storage unit 66, the calculating unit 68 may be configured to determine the offset value of the steering control device mounted to the vehicle. The calculating unit 68 may also be configured to determine the steering control value using the offset value of the steering control device.

The method according to the above-described exemplary embodiment may be embodied as a computer program, which is stored in a non-transitory computer-readable recording medium. Examples of the computer-readable recording medium include ROM, RAM, CD-ROM, magnetic tapes, floppy disks, and optical data storage devices, and further include an implementation in carrier waves (e.g. transmission over the internet). The non-transitory computer-readable recoding medium may also be distributed over network-coupled computer systems so that the computer-readable code is stored and executed in a distributed fashion. Further, functional programs, codes, and code segments for implementing the method according to the disclosed exemplary embodiments may be easily deduced by programmers skilled in the art thereof.

As is apparent from the above description, the present invention provides a steering control method and device for autonomous vehicles, which may directly calculate a steering angle based on information regarding a vanishing point obtained during sensing of traffic lanes, thereby simplifying the calculation process.

Further, since additional information, such as an environment of the road (e.g. an uphill road or a downhill road) on which the vehicle is to travel or be driven, may be derived from the steering angle calculation process, the information may be provided to auxiliary travel devices mounted to the vehicle. Furthermore, the number of control parameters may be reduced through a tuning process based at least on a vanishing point matrix and a weighted value function for steering angle control.

It will be apparent to those skilled in the art that various modifications and variations may be made in the present invention without departing from the spirit or scope of the invention. Thus, it is intended that the present invention covers the modifications and variations of this invention provided they come within the scope of the appended claims and their equivalents.

What is claimed is:

1. A steering control method for autonomous vehicles, comprising:
    sensing traffic lanes on a road on which a vehicle is being driven and deriving a vanishing point positioned on lines extending from the traffic lanes;
    determining a sensitivity of a steering angle that corresponds to a vertical coordinate of the vanishing point in a matrix and determining an initial steering angle that corresponds to a horizontal coordinate;
    determining a steering control value that corresponds to the initial steering angle and the sensitivity of the steering angle; and
    controlling a steering operation of the vehicle based on the steering control value.

2. The steering control method according to claim 1, wherein, based on the vertical coordinate,
    when the vanishing point is located in a center between an upper region and a lower region based on the vertical coordinate, the sensitivity of the steering angle is 1,
    when the vanishing point is located in the upper region, the sensitivity of the steering angle is greater than 1, and
    when the vanishing point is located in the lower region, the sensitivity of the steering angle is less than 1.

3. The steering control method according to claim 1, wherein, based on the horizontal coordinate,
    when the vanishing point is located in a center between a left region and a right region based on the horizontal coordinate, the initial steering angle is 0 degrees, and
    when the vanishing point is located in the left or the right region, the initial steering angle is a position proportional value between the center and a maximum steering angle.

4. The steering control method according to claim 3, wherein the maximum steering angle is a predetermined value that corresponds to a detection range of at least one imaging device mounted to the vehicle.

5. The steering control method according to claim 1, further comprising:
when the vanishing point is located in a center between an upper region and a lower region based on the vertical coordinate, determining an offset value of a steering control device mounted to the vehicle,
wherein the offset value is used to determine the steering control value.

6. The steering control method according to claim 1, wherein the initial steering angle is a value obtained by multiplying a maximum steering angle by a proportional value of the horizontal coordinate, and the proportional value ranges from −1 to 1.

7. The steering control method according to claim 1, wherein the steering control value is determined by the following equation:

$$\delta = 0.5[sgn(vp_y)+1]*(vp_y*steer\_max)*weight_{vp_x} - 0.5[sgn(vp_y)-1]*(vp_y*steer\_max)*weight_{vp_x} + \delta_{offset}$$

wherein delta ($\delta$) is the steering control value, VPx and VPy are, respectively, a vertical coordinate value and a proportional value of the horizontal coordinate, each ranging from −1 to 1,
sgn( ) is a function of outputting 1 when a variable is a positive value and outputting −1 when a variable is a negative value, steer_max is a maximum steering angle, weight$_{VPx}$ is the sensitivity of the steering angle, and delta ($\delta$)$_{offset}$ is an offset value of a steering control device.

8. An apparatus for automatic steering control in a vehicle comprising a processing system that comprises at least one data processor and at least one non-transitory computer-readable memory storing a computer program, wherein the processing system is configured to cause the apparatus to:
sense traffic lanes on a road on which the vehicle is being driven and derive a vanishing point positioned on lines extending from the traffic lanes;
determine a sensitivity of a steering angle that corresponds to a vertical coordinate of the vanishing point in a matrix and determine an initial steering angle that corresponds to a horizontal coordinate;
determine a steering control value that corresponds to the initial steering angle and the sensitivity of the steering angle; and
control a steering operation of the vehicle based on the steering control value.

9. The apparatus according to claim 8, wherein the processing system is further configured to cause the apparatus to:
when the vanishing point is located in a center between an upper region and a lower region based on the vertical coordinate, determine an offset value of a steering control device mounted to the vehicle,
wherein the offset value is used to determine the steering control value.

10. The apparatus according to claim 8, wherein the initial steering angle is a value obtained by multiplying a maximum steering angle by a proportional value of the horizontal coordinate, and the proportional value ranges from −1 to 1.

11. A steering control device for autonomous vehicles including a memory and a processor that is configured to:
sense traffic lanes on a road on which a vehicle is being driven;
derive a vanishing point positioned on lines extending from the traffic lanes;
store a vanishing point matrix for analyzing an environment of the road and a position of the vanishing point;
determine a sensitivity of a steering angle that corresponds to a vertical coordinate in the matrix, determine an initial steering angle that corresponds to a horizontal coordinate, and determine a steering control value that corresponds to the initial steering angle and the sensitivity of the steering angle; and
control a steering operation of the vehicle based on the steering control value.

12. The steering control device according to claim 11, wherein, based on the vertical coordinate,
when the vanishing point is located in a center between an upper region and a lower region based on the vertical coordinate, the sensitivity of the steering angle is 1,
when the vanishing point is located in the upper region, the sensitivity of the steering angle is greater than 1, and
when the vanishing point is located in the lower region, the sensitivity of the steering angle is less than 1.

13. The steering control device according to claim 11, wherein, based on the horizontal coordinate,
when the vanishing point is located in a center between a left region and a right region based on the horizontal coordinate, the initial steering angle is 0 degree, and
when the vanishing point is located in the left or the right region, the initial steering angle is a position proportional value between the center and a maximum steering angle.

14. The steering control device according to claim 13, wherein the maximum steering angle is a predetermined value that corresponds to a detection range of at least one camera mounted to the vehicle.

15. The steering control device according to claim 11, wherein, when the vanishing point is located in a center between an upper region and a lower region based on the vertical coordinate, the steering control device is configured to determine an offset value of the steering control device mounted to the vehicle, and determine the steering control value using the offset value.

16. The steering control device according to claim 11, wherein the initial steering angle is a value obtained by multiplying a maximum steering angle by a proportional value of the horizontal coordinate, and the proportional value ranges from −1 to 1.

* * * * *